April 7, 1931.  H. NAKAGAWA  1,800,095
SNARE
Filed Dec. 29, 1928
Fig. 1.
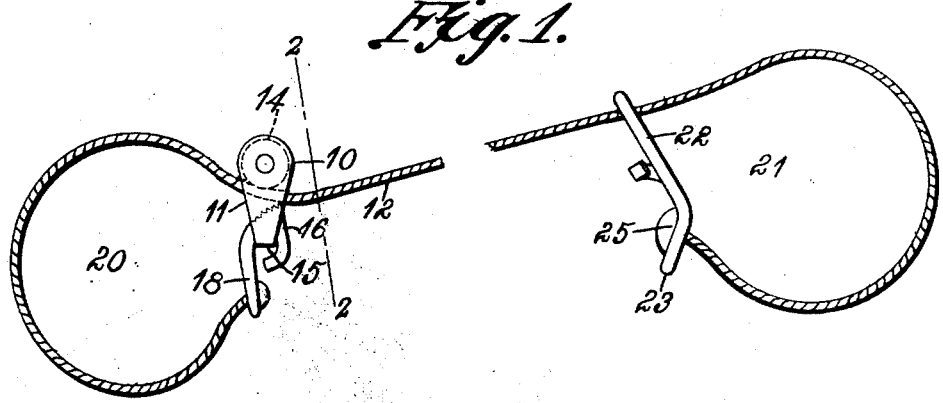
Fig. 2.
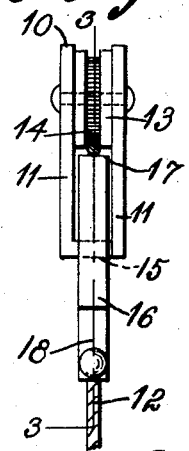
Fig. 3.
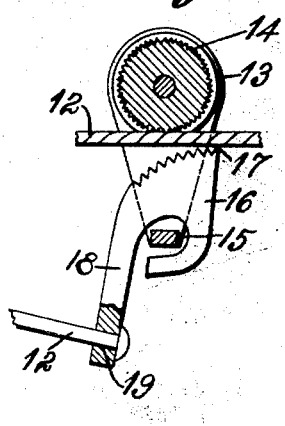
Fig. 4.
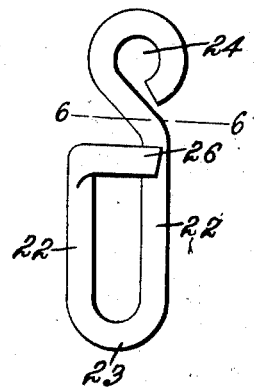
Fig. 5.
Fig. 6.
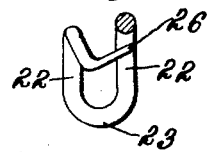
Harry Nakagawa, INVENTOR
BY Victor J. Evans
ATTORNEY
WITNESS:

Patented Apr. 7, 1931

1,800,095

UNITED STATES PATENT OFFICE

HARRY NAKAGAWA, OF TANANA, ALASKA, ASSIGNOR OF ONE-THIRD TO ANDREW B. WEBSTER, OF TANANA, ALASKA

SNARE

Application filed December 29, 1928. Serial No. 329,196.

This invention relates to game snares and has for an object the provision of means to provide a noose at one end of a flexible member for engagement around the neck of a captured animal, with means at the other end of said member to attach the snare to a tree or other stationary member.

Another object of the invention is the provision of novel means for forming the noose so that the latter will be held in open position until released by a pull of the snared animal, the noose then being permitted free closing movement so that the animal will be effectually and quickly choked even though the flexible member should break beyond the noose.

Another object of the invention is the provision of means for quickly and securely forming a loop at the anchor end of the flexible member so that the latter may be readily attached to and removed from a tree or support.

With the above and other objects in view, the invention further includes the following novel features and details of construction, to be hereinafter more fully described, illustrated in the accompanying drawings and pointed out in the appended claims.

In the drawings:—

Figure 1 is a plan view partly broken away illustrating the snare.

Figure 2 is a section on an enlarged scale, the section being taken substantially on the line 2—2 of Figure 1.

Figure 3 is a section on the line 3—3 of Figure 2.

Figure 4 is an elevation of the link.

Figure 5 is a detail perspective view of the link.

Figure 6 is a section on the line 6—6 of Figure 4.

Referring to the drawings in detail wherein like characters of reference denote corresponding parts, the invention as shown comprises a loop forming member which consists of a sheave 10 whose parallel arms 11 provide a guide for a flexible member 12. This member may consist of twisted wire and travels over the pulley 13 of the sheave which, if desired, may be provided with a peripheral groove 14.

Mounted for pivotal movement on the bar 15 which connects the arms 11 of the sheave is a clamp 16. This clamp is provided with an eccentric toothed face 17 and has extending therefrom an arm 18. An eye 19 is provided in the arm by means of which one end of the flexible member 12 may be attached, so that the noose 20 as shown in Figure 1 will be provided.

The noose 20 may be adjusted to the desired size and held in adjusted position by the clamp 16 and when the snare is suitably anchored, an animal poking his head through the noose will exert a pull upon the arm 18 so as to move the clamp pivotally and release the flexible member 12 and permit the noose to freely close about the neck of said animal. Any movement of the member 12 in a reverse direction to open the noose will be resisted by the clamp 16 so that the noose will be securely and tightly held about the neck of the animal and the latter will be quickly and humanely killed even though the flexible member should break beyond the noose. The use of the pulley 13 permits free running action of the flexible member 12 so that the latter may move freely in a direction to tighten the noose during the struggles of the animal caught.

The opposite end of the flexible member is adapted to be formed into a loop 21 for attachment around a tree or other support and for this purpose there is provided a link which is illustrated in detail in Figures 4, 5 and 6. This link comprises spaced parallel arms 22 which are connected at one end as shown at 23. The other end of one of the arms is provided with an eye 24 for the free passage of the flexible member 12 and the latter is provided with a stop 25 so as to prevent disengagement of the flexible member from the link. The other arm 22 is provided with a transversely disposed bar 26 which extends across the link and over the other arm 22 and is spaced from said arm so as to provide an opening or passage for the reception of the flexible member 12. The member may thus be received within the link so as to connect the end of the flexible member with the intermediate portion thereof and provide the loop 21.

The invention is susceptible of various changes in its form, proportions and minor details of construction and the right is herein reserved to make such changes as properly fall within the scope of the appended claims.

Having described the invention what is claimed is:

1. In an animal snare, a flexible member, a connecting link at one end of said member, said link comprising spaced parallel arms connected at one end, an eye at the other end of one of the arms for engagement with the flexible member, and an inwardly extending transversely disposed bar projecting from the other arm and having its free end extending over and spaced from the first referred to arm to provide a passage for the flexible member.

2. In an animal snare, a flexible member, and an open ended link at one end of the flexible member, said link having an extended end providing an eye for attachment to the end of the flexible member whereby said member may be passed through the link for engagement around a stationary element.

3. In a snare, a sheave, a flexible member movable through the sheave and bearing upon the pulley of the sheave, a toothed clamp pivoted in said sheave and having a curved binding surface eccentric to the pivot to engage the flexible member to bind the latter against the pulley, an arm extending from the clamp and having the flexible member secured to its outer end to provide a noose and move the clamp pivotally to release the flexible member and permit the noose to close, and anchoring means at the other end of the flexible member.

In testimony whereof I affix my signature.

HARRY NAKAGAWA.